United States Patent [19]

Lenius et al.

[11] 4,143,781

[45] Mar. 13, 1979

[54] HOISTING MECHANISM FOR STRADDLE CARRIER SPREADER AND STRADDLE CARRIER STEERING SYSTEM

[75] Inventors: Norbert W. Lenius; Richard A. Stearn, both of Sturgeon Bay, Wis.

[73] Assignee: J. I. Case Company, Racine, Wis.

[21] Appl. No.: 844,654

[22] Filed: Oct. 25, 1977

Related U.S. Application Data

[62] Division of Ser. No. 729,402, Oct. 4, 1976.

[51] Int. Cl.² .................................................. B60P 3/00

[52] U.S. Cl. ...................................... 414/460; 180/140

[58] Field of Search ............... 214/390, 392, 394, 396; 254/139-145; 294/81 R, 81 SF; 212/14

[56] References Cited

U.S. PATENT DOCUMENTS

| | | | |
|---|---|---|---|
| 3,688,931 | 9/1972 | Tax | 214/394 |
| 3,982,644 | 9/1976 | Pease | 214/394 |

*Primary Examiner*—Albert J. Makay
*Assistant Examiner*—Donald W. Underwood
*Attorney, Agent, or Firm*—Dressler, Goldsmith, Clement, Gordon & Shore, Ltd.

[57] ABSTRACT

A hoisting mechanism for a spreader of a straddle carrier is disclosed herein. The hoisting mechanism includes two fluid rams respectively located at diagonal corners of a generally inverted U-shaped frame. One fluid ram is connected to one end of the spreader through three parallel flexible members with the intermediate flexible member connected to one corner of the spreader and the two outer flexible members are connected to the opposite corner of the spreader. The disclosure also shows a unique steering linkage for steering all eight wheels that support the straddle carrier.

9 Claims, 8 Drawing Figures

HOISTING MECHANISM FOR STRADDLE CARRIER SPREADER AND STRADDLE CARRIER STEERING SYSTEM

REFERENCE TO RELATED APPLICATION

This application is a division of U.S. Application Ser. No. 729,402, filed Oct. 4, 1976.

BACKGROUND OF THE INVENTION

With the advent of large vans in container handling systems, sometimes referred to as "containerization" in the industry, a need has been developed for specialized vehicles that are adapted to efficiently handle and transport such containers, particularly in transport facilities, such as railroad yards and docks. In order to "standardize" the container industry, containers are usually either 20 or 40 feet in length and have specially adapted brackets at the corners thereof, which are adapted to receive latches to support the containers during transportation. The vehicles that have been utilized for such transportation generally consist of an inverted U-shaped frame that has wheels on the lower ends of the respective legs and the legs define an elongated open bay with a spreader unit supported in the open bay of the vehicle. The spreader normally has latches at the respective corners thereof for connection to a container and the spreader is capable of being elevated through some type of hoisting means.

Most of the prior art units of this type are primarily designed for hoisting and lowering containers, particularly in railroad yards where the units are used for placing containers onto a flatbed or a railroad car. These units generally are operated at very low speeds and normally have a maximum speed of 5 MPH.

SUMMARY OF THE INVENTION

The straddle carrier of the present invention, is a highly maneuverable unit which is capable of being operated at speeds of up to 20 MPH, while carrying a fully loaded container, which may weigh substantially more than 50,000 pounds.

The unique straddle carrier consists of a generally inverted U-shaped frame, having two transversely spaced vertical legs interconnected at their upper ends by a horizontal frame portion with the vertical legs respectively supported on a plurality of wheels. Each of the legs has a separate engine supported thereon and each engine drives a plurality of pumps. The first pump, driven by each engine, is connected to drive motors that are associated with at least one of the wheels on the associated leg of the frame. Each engine drives at least a further pair of pumps which are utilized for performing a plurality of control functions associated with the straddle carrier.

More specifically, the direction of the vehicle is controlled through a hydraulic power steering system for turning all of the wheels and hydraulic fluid is supplied to the power steering system from one pump of the pair of pumps on the first leg of the vehicle. A spreader is supported for vertical movement in the bay by a plurality of hoisting fluid rams and the spreader has a plurality of additional fluid rams for performing a plurality of control functions to connect a container thereto. The additional fluid rams have hydraulic fluid supplied thereto from one pump of the pair of pumps on the second leg of the U-shaped frame while hydraulic fluid is supplied to the hoisting fluid rams from the remaining pumps that are driven by the respective engines.

According to the primary aspect of the present invention, the hydraulic circuit incorporates interconnection means which is capable of selectively connecting both the power steering system and the plurality of additional fluid rams to one pump driven by one engine so that all of the functions are capable of being performed by a single engine. The interconnection means incorporates a plurality of quick-disconnect couplings which can readily be disconnected and connected to other coupling elements so that either first pump of the first and second pairs of pumps, driven by the respective engines, can be connected in series with both the power steering system as well as the plurality of additional fluid rams, to have a single pump providing hydraulic fluid to both systems.

In the specific embodiment illustrated, the hoisting fluid rams include a first fluid ram on the first leg of the vehicle with the first fluid ram having one end operatively connected to one end of the spreader and pressurized fluid is supplied thereto from one of the first pair of pumps. A second fluid ram is supported on the second leg and is operatively connected to the opposite end of the spreader with the second fluid ram having fluid supplied thereto from one of the second pair of pumps.

The interconnecting means includes means for connecting both of the fluid rams to one of the pumps so that both fluid rams can be actuated from a pump driven by one of the engines.

The respective hoisting fluid rams are connected to the respective ends of the spreader through a hoisting chain assembly that includes three elongated flexible members associated with each fluid ram and extending parallel to each other. One end of each of the flexible members is connected to the frame adjacent the associated fluid ram and each of the flexible members extends over a first pulley that is supported on a free end of an extensible element that forms part of the hoisting fluid ram. The respective flexible members are then entrained over a first idler pulley that is located above one of the corners of the frame at the upper end thereof. The two outermost flexible members are then entrained over a second pulley that is generally in vertical alignment with one corner of the spreader and both of the flexible members are connected to that corner of the spreader. The remaining or intermediate flexible member is entrained over an additional pulley that is supported on the frame and is generally vertically aligned with an opposite adjacent corner of the spreader with the intermediate flexible members attached to the adjacent corner of the spreader. Therefore, a single, fluid ram is capable of raising and lowering one end of the spreader and the load on the end of the fluid ram will always be centered regardless of the uneven loading of the respective corners of the spreader. This necessarily results from the fact that the center intermediate flexible member extends across the centers of the respective pulleys, particularly the pulley at the free end of the fluid ram, while the two flexible members connected to an opposite corner are equally spaced from the center of the pulley on the fluid ram. The second fluid ram is connected to the remaining corners of the spreader through the three flexible members as described above.

According to one further aspect of the invention, the hydraulic circuit for supplying fluid to the respective hoisting fluid rams or cylinder and piston rod asemblies, incorporates an anti-tilt circuit that prevents the spreader from being tilted beyond a predetermined maximum angle with respect to a horizontal reference plane. The hydraulic circuit for supplying fluid to the hoisting fluid rams includes a reservoir, a pressurized fluid source with first and second electrically operated valves, each connected to the reservoir and pressurized fluid source and respectively connected to opposite ends of the cylinders of the respective hoisting fluid rams. An electric circuit supplies current through separate circuits to the respective electrically operated valves so that the valve spools thereof are moved in proportion to the current flow in either direction. The electricl circuit includes a manual control in the respective circuits so that either or both valves can be actuated to raise or lower either end of the spreader or simultaneously raise or lower both ends of the spreaders.

The electric circuit also includes attitude control circuit means consisting of first and second relay means, each having a pair of normally closed sets of contacts in the respective circuits leading to the respective electrically operated valve. A pendulum control member is supported for free movement on the spreader and actuates one of the two relays when the spreader reaches a maximum attitude with respect to a horizontal reference plane. Thus, when a spreader reaches a maximum attitude with respect to a reference plane, the electric circuits to the respective control valves are opened to prevent any further tilting of the spreader.

The electric circuit also incorporates bypass switch means that are in parallel with each of the sets of contacts and are responsive to reverse polarity in the respective circuits to the control valves so that the spreader can be tilted towards the reference plane through current flow through the bypass switch means.

The spreader is supported on a pair of transversely extending beams that are guided for vertical movement at opposite ends on the respective vertical legs of the inverted U-shaped frame and the spreader is capable of being shifted transversely on the beams through two fluid rams that are included in the plurality of fluid rams that perform the control functions to connected the container to the spreader. The circuit means for supplying hydraulic fluid to the side shift fluid rams for the spreader, also incorporate centering means for automatically centering the spreader between the respective legs in response to actuation of the centering means.

The straddle carrier, in its specific embodiment, is supported by four wheels on the lower end of each of the two legs of the inverted U-shaped frame. All of the wheels are controlled by a single-power steering system that includes a single power steering pump and steering wheel for supplying fluid to a plurality of fluid rams located in the steering linkage between the respective wheels on each side of the vehicle. Also the respective wheels on each side of the vehicle are interconnected through a linkage so that all of the wheels are turned in synchronized relation with fluid supplied from the power steering pump to the respective fluid rams.

BRIEF DESCRIPTION OF SEVERAL VIEWS OF DRAWINGS

Figure 1:
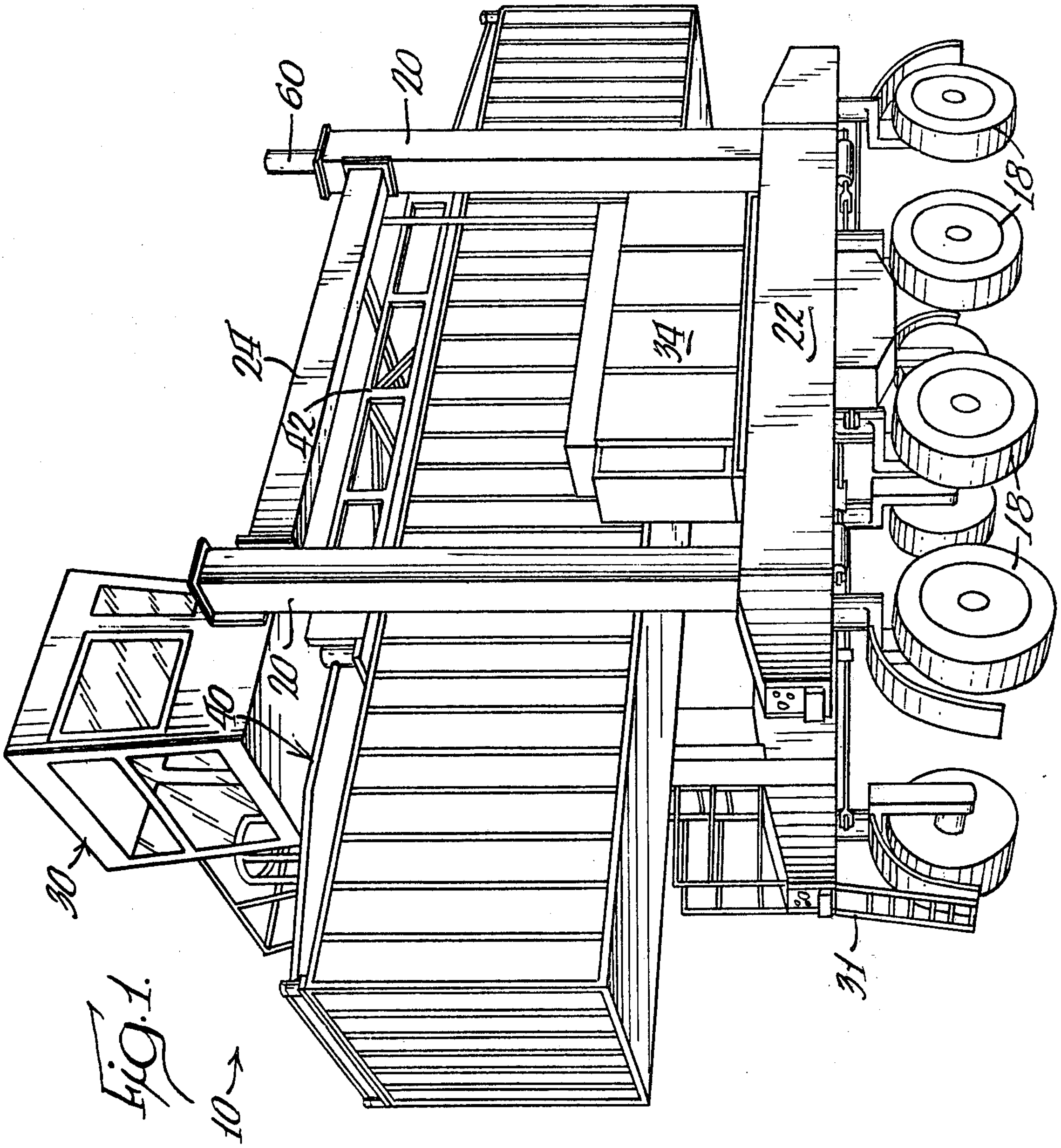
FIG. 1 shows a perspective view of the straddle carrier having the various features of the present invention incorporated therein.
Figure 2:
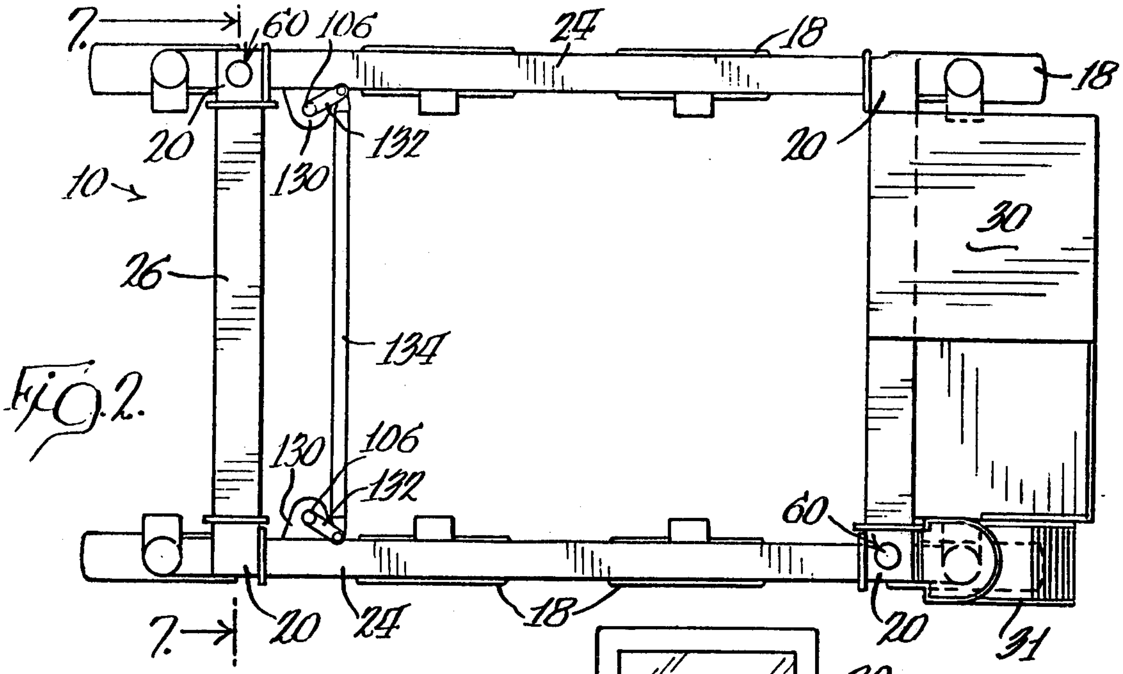
FIG. 2 is a plan view of the straddle carrier with the spreader deleted therefrom.
Figure 3:
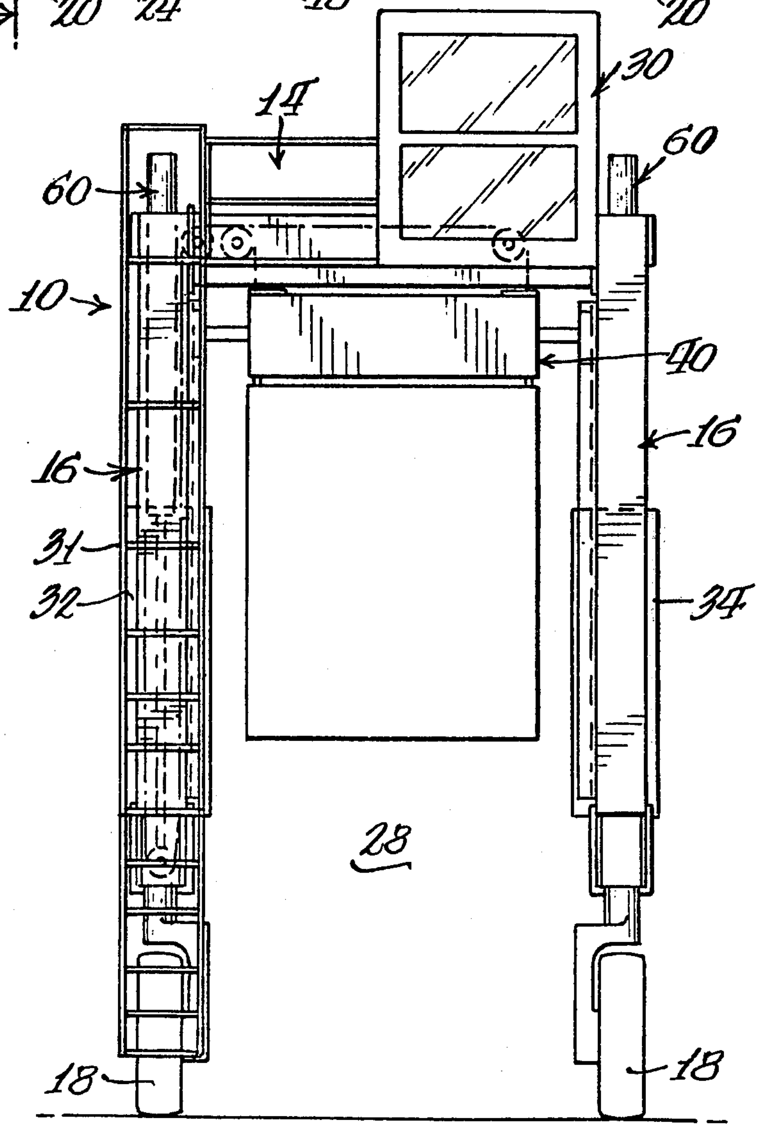
FIG. 3 is an end view of the straddle carrier showing a container being supported therein.
Figure 4:
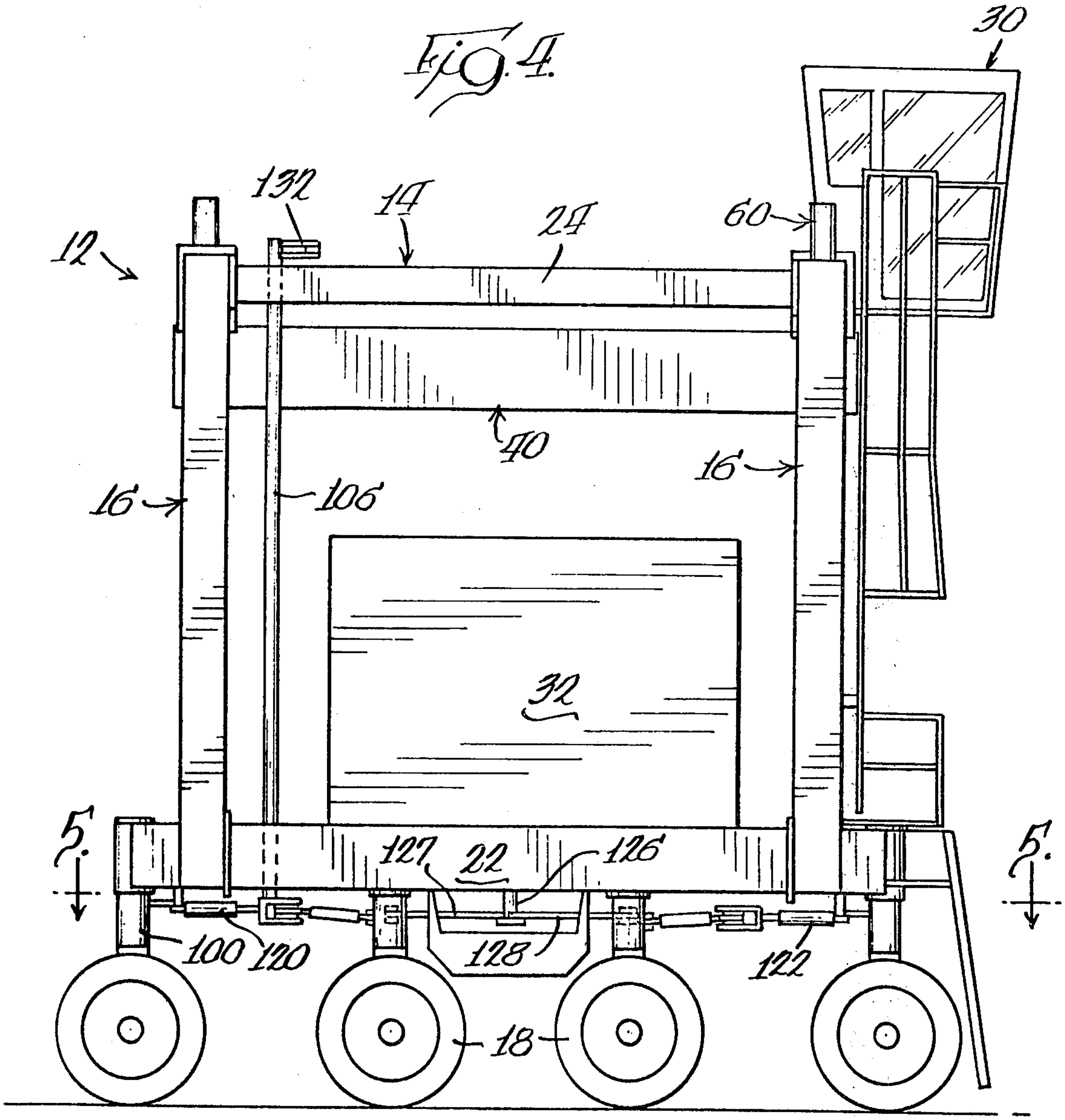
FIG. 4 is a side elevation view of the straddle carrier shown in FIG. 1.
Figure 5:
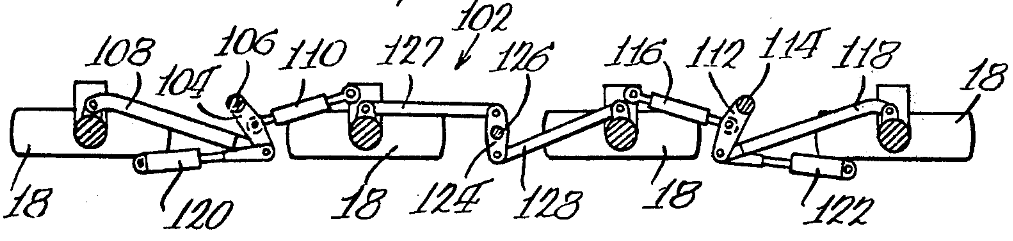
FIG. 5 is a fragmentary horizontal section as viewed along line 5—5 of FIG. 4.
Figure 6:
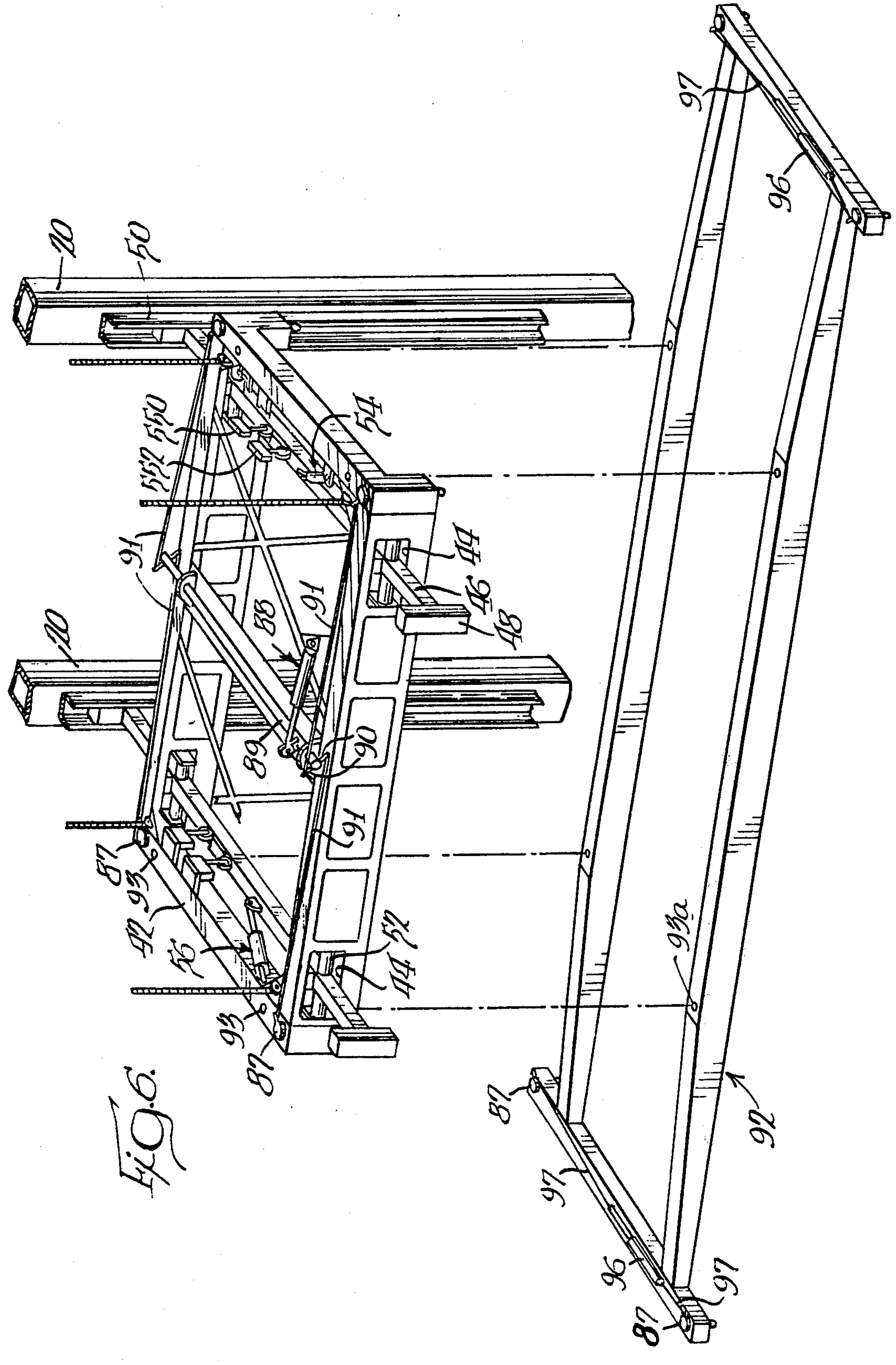
FIG. 6 is a perspective view of the spreader that forms part of the straddle carrier shown in FIG. 1 and its support on the frame.
Figure 7:
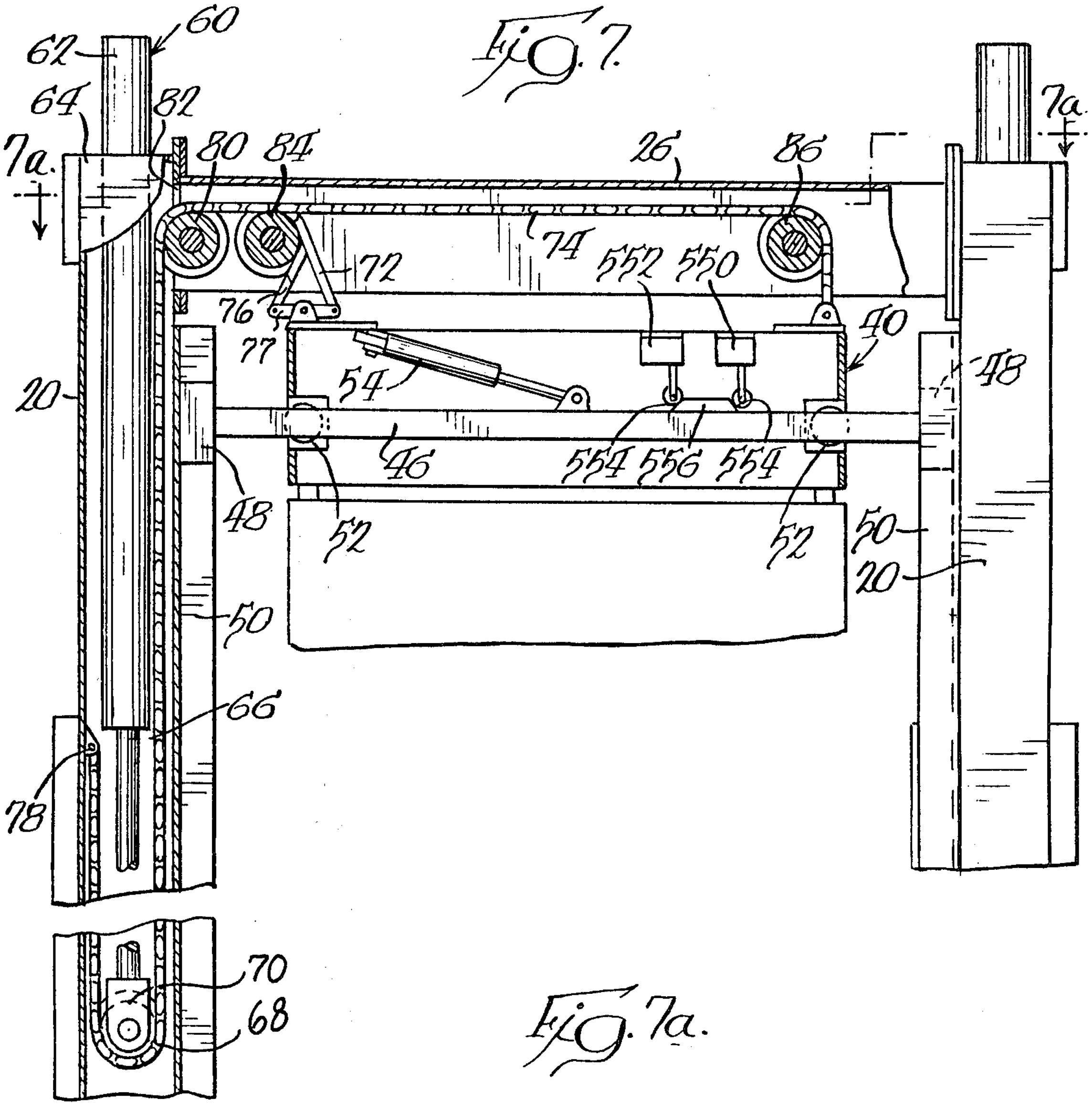
FIG. 7 is a fragmentary vertical sectional view as viewed along line 7—7 of FIG. 2.

FIG. *7a* is a fragmentary sectional view as viewed along *7a—7a* of FIG. 7.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

GENERAL ARRANGEMENT

FIGS. 1 through 4 show a straddle carrier or vehicle, generally designated by the reference numeral 10, which consists of a generally inverted U-shaped frame 12 having an upper horizontal portion 14 and a pair of spaced legs 16 depending from opposite edges of the upper horizontal portion. Each leg 16 is supported at its lower end by a plurality of wheels 18 as will be described in more detail later.

Frame structure 12 is most clearly illustrated in FIGS. 1 through 4 and each of the vertical legs 16 includes two longitudinally spaced, vertically extending hollow columns 20 that are interconnected at their lower ends by an elongated hollow column 22 and at their upper ends by an elongated hollow beam 24. The upper ends of the respective hollow vertical columns 20 are interconnected by transverse horizontal hollow columns 26 to define the generally inverted U-shaped frame that defines an elongated open cargo receiving bay 28.

The frame structure also has an operator's compartment or cab 30 supported at one corner of the vehicle frame and the cab is accessible through a ladder 31 attached to one vertical column 20. In the subsequent description, the end of the frame having cab 30 supported thereon, will be referred to as the forward or front end, while the opposite end will be referred to as the rear end. However, it should be pointed out that, as will be described later, the vehicle is capable of being operated in either direction at a full range of speed and therefore the terms front and rear are being used only for descriptive purposes.

According to one aspect of the invention, vehicle 10 has first and second engine compartments 32 and 24 respectively supported on lower horizontal columns 22 of the first and second legs. First and second separate engines are respectively supported in the engine compartments and each engine drives a plurality of pumps for supplying hydraulic fluid to a plurality of motors and rams, as will be explained later.

Vehicle 10 also incorporates a spreader 40 supported for vertical movement within open bay 28 through a hoisting mechanism that will be described in more detail later.

Spreader and Hoisting Mechanism

Spreader 40 consists of a generally elongated lattice frame structure 42 that has two pairs of transversely aligned openings 44 adjacent the respective corners thereof. First and second elongated transversely extending beams 46 extend through the respective pairs of openings and each beam 46 terminates adjacent one of the vertical columns 20. The respective outer ends of the horizontal beams 46 have Nylatron blocks 48 secured thereto, which are guided for vertical movement in open guide members 50 that are secured to vertical columns 20.

The respective beams are supported within the respective openings 44 through cushioning members or resilient shock absorbing elements 52, that normally maintain beams 46 in a forward and aft centered position with respect to the elongated open bay 28 but accommodate some forward and aft movement of the spreader with respect to the beams.

The spreader is capable of being shifted transversely of beams 46 to accurately align the spread with a container after the container is located in elongated bay 28. For this purpose, first and second fluid rams 54 and 56 are respectively interposed between the respective beams 46 and opposite ends of spreader 40. The operation of these fluid rams will be described in more detail later.

Spreader 40 is adapted to be raised and lowered through hoisting fluid ram means consisting of first and second hoisting fluid rams 60 that are respectively located in diagonal vertical hollow columns 20 and connected to spreader 40 through flexible members, as will be described later. Since the interconnection between the respecitve fluid rams 60 and spreader 40 is the same for both fluid rams, only one will be described in detail with particular reference to FIGS. 7 and 7*a*.

Figure 7A:
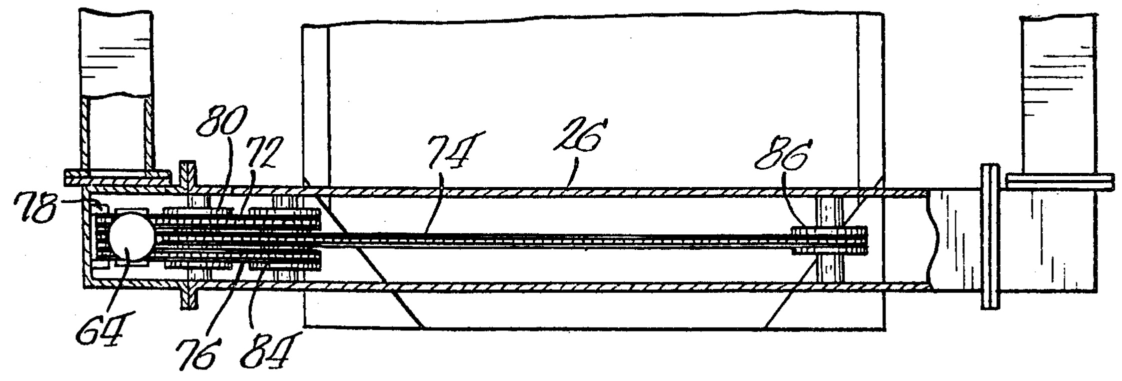

As shown in FIG. 7*a*, fluid ram 60 includes a first element or cylinder 62 that has a rigid plate 64 secured intermediate opposite ends thereof, as by welding and plate 64 is secured to hollow vertical column 20 at the upper end thereof. The major portion of cylinder 62 is located within hollow column 20 and has a piston rod or second element 66 extending from the lower free end thereof. Piston rod 66 has a pulley 68 secured to the lower end thereof through a clevis 70.

Three flexible members are utilized for operatively connecting the free end of piston rod 66 to one end of spreader 40. As more clearly shown in FIG. 7*a*, the operative interconnection includes first, second and third transversely spaced flexible members 72, 74, and 76 that each have one end thereof fixedly secured to the frame, particularly to an inner surface of hollow column 20 and 78. All three flexible members extend over pulley 68, secured to the free end of piston rod 66, and then extend vertically within column 20 and are entrained over an idler pulley 80. This idler pulley 80 is located adjacent the intersection between hollow interconnecting column 26 and vertical column 20 which are in communication with each other through an opening 82. The two outer flexible members 72 and 76 are entrained over an additional pulley 84 that is located within hollow column 26 in vertical alignment with one corner of the spreader and these two flexible members are connected to the corner of spreader 40. The connection between flexible members 72 and 76 and spreader 40 includes an equalizing link 77 pivotally connected to the spreader and to both links. The intermediate flexible member 74 is entrained over a further pulley 86 that is generally vertically aligned with the second corner of the spreader and flexible member 74 is connected to the second corner of spreader 42.

With the above arrangement of interconnecting a single fluid ram to two corners of the spreader, the load on the respective corners of the spreader will at all times be equally distributed over the respective pulleys. For example, should the majority of the load be supported by the corner portion of the spreader having the two flexible members 72 and 76, secured thereto, the load on this corner would still be spread equally onto pulleys 68 and 80 because the two flexible numbers are equally spaced from the centers of the pulleys. This reduces the wear on the pulleys and eliminates any bending stresses that would otherwise be developed on piston rod 66.

Spreader frame 42 has four latches 87 located at the respective corners of the frame and each latch is capable of being moved between latched and unlatched positions by rotation of the latching mechanism through an arc of 90 degrees. Since the latching mechanisms 87 are a "standard" in the industry, no detailed description thereof appears to be necessary.

Latches 87 are moved between latched and unlatched positions through a fluid ram 88 that is connected to a rod 89 extending across the center of spreader frame 42. The opposite ends of rod 89 have arms 90 extending therefrom and arms 90 are respectively connected to the respective latches through links 91. Thus, extension of the piston rod of fluid ram 88 will rotate latches 87 to a latched position so that a container can be locked to spreader 40 while retraction of the piston rods will unlatch the container from the spreader 40.

As was indicated above, the carrier is also designed to be capable of handling containers of two different sizes, such as 20 foot containers and 40 foot containers. Spreader 40 is designed to be able to attach a 20 foot container thereto. If it is desired to lift and transport 40 foot containers, a second or daughter spreader 92 is aligned with the first or mother spreader 40 and is connected thereto by four latching assemblies 93 that are carried by mother spreader 42 and are received into openings (93*a*) in the daughter spreader 92. The respective latches 93 may be moved between positions through a manual lever 94 connected thereto through links 95.

The respective latches 87 on the four corners of the daughter spreader are preferably moved between the latched and unlatched positions through separate fluid rams that cooperate with opposite ends of the spreader. Thus, as shown in the drawings, each end of spreader 92 has a fluid ram 96 supported thereon which is connected to a pair of latches 87 on one end of the spreader through a linkage 97.

Steering System

As indicated above, each leg of the vehicle is supported by four wheels that are rotated about fixed vertical axes on the respective legs of the vehicle. Preferably the rotational support for the wheels also provides the suspension for the vehicle to cushion the vehicle from shock forces which may result from traveling over uneven terrain. Accordingly, the support for each wheel consists of a telescoping column 100 that includes outer and inner telescoping members with a plurality of rubber bonded to metal pads between the two members. This type of suspension system is commercially available as an "Off-Highway Suspension System With Modular Impact Pads" that is sold by the Dynafloat Division of Unit Rig and Equipment Co., Tulsa, Okla.

The steering system includes a separate linkage system for each set of four wheels on opposite sides of the vehicle, with the respective linkage systems interconnected as will be described later. Each linkage system 102 includes a first arm 104 that is connected at one end to a shaft 106 which is rotatably supported on horizontal column 22. The arm is located between the rear adjacent pair of wheels 18 and is connected to the respective wheels through first and second links 108 and 110. Likewise, the forward pair of wheels 18 have a link 112 supported on a shaft 114 that is located between the two wheels and is rotatably supported on horizontal column 22. Second arm 112 is again connected to the adjacent forward pairs of wheels 18 through links 116 and 118.

The respective arms 104 and 112 are rotated to turn the respective wheels 18 through first and second fluid rams 120 and 122 that are interposed between the free ends of arms 104 and 112 and horizontal column 22 of legs 16. Thus, both pairs of wheels are independently turned by supplying hydraulic fluid from a steering system, to be described later, to the respective fluid rams. Of course, it will be appreciated that the respective pairs of wheels on one side of the vehicle must be turned in different directions so that all of the wheels have the common radius of turn. In order to insure that both sets of wheels on one side are turned in synchronized relation to each other, the intermediate two wheels are also interconnected with each other through an arm 124, that is pivoted intermediate its ends on a shaft 126 and is connected through one link 127 to one of the intermediate wheels and through a second link 128 to the other of the intermediate wheels. Thus, all four wheels on one side of the vehicle are simultaneously turned when hydraulic fluid is applied to fluid rams 120 and 122. All of the links are preferably adjustable in length so that the turning movement of the respective wheels can be independently adjusted.

In addition, the steering system also incorporates a cross-linkage interconnection between the two linkage systems 102 on the respective legs of the vehicle. As most clearly shown in FIGS. 2 and 4, the two vertical shafts 106 extend upwardly and are supported at their upper ends on brackets 130 that are secured to upper horizontal columns 24. The upper ends of shafts or rods 106 each have a link 132 rigidly secured thereto with the two links 132 interconnected by a cross-member 134 which is preferably adjustable in length. Thus, the rigid interconnection between the two linkage systems on the respective sides of the vehicle will insure a synchronized turning movement of all the wheels when hydraulic fluid is supplied to the respective fluid rams, as will be described later.

The linkage system is therefore extremely compact in transverse dimension and is located within the confines of the lower horizontal column 22.

What is claimed is:

1. In a vehicle having an inverted U-shaped frame having an upper horizontal portion and a pair of spaced legs defining an elongated container carrying bay with a spreader supported for vertical movement in said bay and first and second hoist means respectively connected to opposite ends of said spreader, the improvemnt of each of said hoist means comprising a vertically extending fluid ram having a first element connected to said frame and a second element supported for movement on said first element with a first pulley rotatably supported on a free end of said second element, three elongated flexible members extending parallel to each other and entrained over said first pulley with one end of each flexible member connected to said frame adjacent said fluid ram, a second pulley on said horizontal portion of said frame above one end corner of said spreader with an intermediate flexible member of said three elongated flexible members entrained over said second pulley and a third pulley on said horizontal portion of said frame above an adjacent corner of said spreader with both outer of said flexible members entrained over said third pulley and connected to said adjacent corner so that any load supported on said spreader is distributed equally across said first pulley regardless of the unequal distribution of load at the two adjacent corners of said spreader.

2. A vehicle as defined in claim 1, in which each connection between both outer flexible members and the adjacent corner of the spreader includes a link having an intermediate portion pivoted on said spreader with the two flexible members respectively pivotally connected to opposite ends of said link.

3. A vehicle as defined in claim 1, in which each of said legs includes a hollow vertical column at each end thereof with the four vertical columns generally defining the respective corners of said vehicle and the upper horizontal portion is defined by two horizontal hollow columns interconnecting the respective vertical columns at opposite ends of said frame and in which one of said fluid rams is located in one hollow vertical column of one leg and the other fluid ram is located in a diagonal vertical column of the other leg.

4. A vehicle as defined in claim 3, in which said first element of each fluid ram is a cylinder connected to an upper end of an associated vertical column and said second element includes a piston rod extending from the lower end of said cylinder within said associated hollow vertical column.

5. A vehicle as defined in claim 4, in which one hoisting means includes one idler pulley located adjacent the intersection of said one hollow vertical column and one horizontal hollow column with three flexible members entrained over said one idler pulley and the other hoisting means includes a second idler pulley located adjacent the intersection of the diagonal vertical column and the other horizontal column and in which the respective first and second pulleys are located within the respective horizontal hollow columns.

6. A vehicle as defined in claim 3, in which the intermediate flexible member of each hoist means is connected to a corner of the spreader which is remote from the vertical column having the associated fluid ram located therein.

7. A vehicle as defined in claim 1, in which each leg of said U-shaped vehicle is supported by four longitudinally spaced wheels each rotatably supported for rotation about a fixed vertical pivot axis, further including a separate linkage system for each set of wheels cooperating with each leg, each linkage system including first and second arms respectively pivotally supported about fixed vertical axes on a leg between respective pairs of wheels, a pair of links connected to each arm at different locations with the respective links connected to a wheel so that movement of each arm will provide turning movement of said arms which will turn one pair of wheels on each leg in one direction and the other pair of wheels on each leg in an opposite direction and will produce differential rotation of the wheels of each pair, each linkage system including an interconnecting linkage between adjacent wheelsd of the respective pairs of wheels, fluid ram means between each arm and leg for moving said arms, and a cross linkage interconnecting one linkage system of one leg with the second linkage system on the second leg of said vehicle so that said wheels are all turned in synchronized relation when fluid is supplied to said fluid ram means.

8. A steering system as defined in claim 7, in which the interconnecting linkage of each linkage includes a further arm having an intermediate portion pivotally supported between the respective pairs of wheels on the associated leg and further links connecting opposite ends of the further arm to adjust wheels of the respective pairs of wheels.

9. A steering system as defined in claim 8, in which each linkage system is located within the peripheral confines of an associated leg.

* * * * *